(12) United States Patent
Thazhathekalam et al.

(10) Patent No.: US 9,009,143 B2
(45) Date of Patent: Apr. 14, 2015

(54) USE OF OFF-PAGE CONTENT TO ENHANCE CAPTIONS WITH ADDITIONAL RELEVANT INFORMATION

(75) Inventors: Krishnan Thazhathekalam, Mountain House, CA (US); David Simpson, San Francisco, CA (US); David D. Ahn, San Francisco, CA (US); Andrea Burbank, Chicago, IL (US); Franco Salvetti, San Francisco, CA (US); Christopher Jon Jewell, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/251,297

(22) Filed: Oct. 3, 2011

(65) Prior Publication Data

US 2013/0086041 A1    Apr. 4, 2013

(51) Int. Cl.
  *G06F 17/30*   (2006.01)
  *G06Q 30/02*   (2012.01)

(52) U.S. Cl.
  CPC ...... *G06F 17/30864* (2013.01); *G06Q 30/0251* (2013.01)

(58) Field of Classification Search
  USPC ......................................................... 707/722
  See application file for complete search history.

(56) References Cited

U.S. PATENT DOCUMENTS

| | | | |
|---|---|---|---|
| 5,642,502 A | | 6/1997 | Driscoll |
| 5,855,015 A | * | 12/1998 | Shoham ........................ 715/205 |
| 5,991,739 A | * | 11/1999 | Cupps et al. ................. 705/26.8 |
| 6,735,585 B1 | * | 5/2004 | Black et al. ........................... 1/1 |
| 6,763,496 B1 | * | 7/2004 | Hennings et al. ............. 715/205 |
| 7,047,242 B1 | * | 5/2006 | Ponte .................................... 1/1 |
| 7,165,119 B2 | | 1/2007 | Fish |
| 7,624,101 B2 | * | 11/2009 | Lin et al. ............................... 1/1 |
| 7,698,344 B2 | | 4/2010 | Sareen et al. |
| 8,086,604 B2 | * | 12/2011 | Arrouye et al. ............... 707/731 |
| 8,086,608 B2 | * | 12/2011 | Hampton ...................... 707/737 |
| 8,150,824 B2 | * | 4/2012 | Marmaros et al. ............ 707/706 |
| 2003/0172075 A1 | * | 9/2003 | Reisman ......................... 707/10 |
| 2005/0080771 A1 | | 4/2005 | Fish |
| 2005/0165644 A1 | * | 7/2005 | Beyda et al. ..................... 705/14 |
| 2006/0161522 A1 | * | 7/2006 | Dettinger et al. ................. 707/3 |
| 2007/0067255 A1 | * | 3/2007 | Bissett et al. ..................... 707/1 |

(Continued)

OTHER PUBLICATIONS

Brenes, et al., "On the Fly Query Segmentation Using Snippets", Retrieved at <<http://ir.ii.uam.es/ceri2010/papers/ceri2010-brenes.pdf>>, Proceedings of the First Spanish Congress on Information Retrieval (CERI), Jun. 15-16, 2010.

(Continued)

*Primary Examiner* — Cam Truong
(74) *Attorney, Agent, or Firm* — David Ream; Peter Taylor; Micky Minhas

(57) ABSTRACT

Architecture that uses content from off-page data sources such as feeds (e.g., yellow pages, coupons, social networks, commerce, etc.) to present additional, relevant information in association with search results. The additional and relevant information is directly relevant to the implicit task the user is trying to accomplish. The architecture includes online and offline mechanisms that identify an entity represented on a web page and look-up information related to that entity in disparate data sources. Relevance heuristics are employed to determine which of the available entity data to show in the caption given the user query, the web page, and the underlying user task (other known information about the user such as geographic location).

20 Claims, 10 Drawing Sheets

(56) References Cited

U.S. PATENT DOCUMENTS

| | | |
|---|---|---|
| 2008/0204595 A1 | 8/2008 | Rathod et al. |
| 2008/0228720 A1* | 9/2008 | Mukherjee et al. ............... 707/3 |
| 2009/0327268 A1 | 12/2009 | Denney et al. |
| 2010/0257150 A1* | 10/2010 | Lu et al. ...................... 707/713 |
| 2011/0016106 A1* | 1/2011 | Xia ............................ 707/706 |
| 2011/0047509 A1* | 2/2011 | Arrasvuori .................. 715/815 |
| 2011/0213765 A1* | 9/2011 | Cui et al. .................... 707/711 |

OTHER PUBLICATIONS

Kanis, Zwier, "Online Search Interfaces: A future look", Retrieved at <<http://hmi.ewi.utwente.nl/verslagen/capita-selecta/CS-Kanis-Zwier.pdf>>, Retrieved Date: Jun. 3, 2011.

"Presenting Actions and Providers Associated with Entities" U.S. Appl. No. 12/941,315, filed Nov. 8, 2010.

* cited by examiner

USE OF OFF-PAGE CONTENT TO ENHANCE CAPTIONS WITH ADDITIONAL RELEVANT INFORMATION

BACKGROUND

Searches performed by users are increasingly being used to accomplish tasks such as making a dinner reservation, for example. Search engines can assist users with finding a website to perform a task. However, upon navigating to the website the user still has to navigate the website and re-enter information previously provided in the search query to complete the desired task. Moreover, since tasks can be performed in association with various entities such as people, places, and things, the existing search experience typically involves the user spending an unnecessary amount of time finding the desired information.

SUMMARY

The following presents a simplified, summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides the capability to use content from off-page data sources such as feeds (e.g., yellow pages, coupons, social networks, commerce, etc.) to present additional, relevant information in search result captions. A caption can be defined as a subset of a search result (also called a search result entry), to include a title section, snippet section, and URL (uniform resource locator) of a target page or document of the result. The caption on the search engine results page (SERP) contains content taken directly from the text of the target page (or in a very small number of cases, from editorial sources). The additional and relevant information is directly relevant to the implicit task the user is trying to accomplish.

The architecture includes online and offline mechanisms that identify an entity represented on a web page and look-up information related to that entity in disparate data sources. Relevance heuristics are employed to determine which of the available entity data to show in the caption given the user query, the web page, and the underlying user task (other known information about the user such as geographic location).

More specifically, the offline mechanism groups entities (and data available about these entities) by URL. This entity data is then injected into a cached copy of the URL in the search engine network content index. An online mechanism retrieves the stored entity data at runtime and determines if additional data is required. If so, a realtime call is made to the appropriate feed/data source that contains additional data about the entity.

To the accomplishment of the foregoing, and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
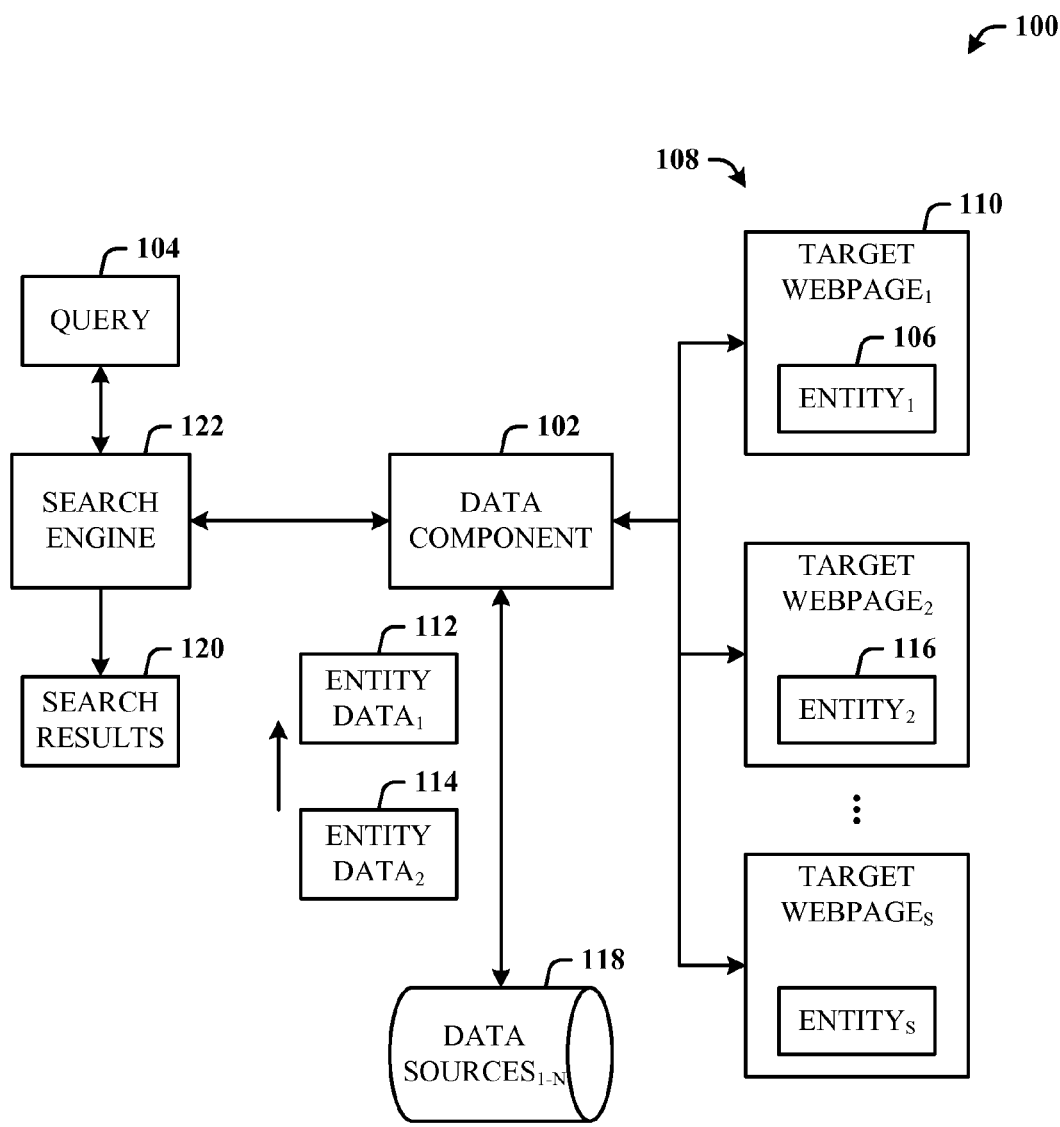
FIG. 1 illustrates a system in accordance with the disclosed architecture.

The disclosed architecture operates to find and make available additional off-page information for presentation with a search result (also referred to as a caption) on a search engine results page (SERP). The caption can employ content from off-page data sources such as search engine feeds (e.g., yellow pages, coupons, social networks, etc.) to present the additional and relevant information (also referred to herein as entity data). This additional content enhances the caption with information not currently found in the caption elements (title, snippet, and URL (uniform resource locator)) and is directly relevant to the underlying task the user is trying to accomplish.

An example is a case where the user queries for a particular restaurant. The architecture operates to enhance the caption for the restaurant home page with information related to coupons/deals currently available at the restaurant, nearby parking information, and guest reviews, for example. Thus, a single query will result in gathering and presentation of this information, rather than via multiple queries. The architecture therefore enables a more holistic view of the underlying task implicit in the user's query to plan an evening, out to a restaurant), and extracts additional information (entity data) such as concepts and content from various data sources to satisfy that task.

Grouping information from disparate sources, but related and relevant to the user's underlying goal, enables the user to complete the task with fewer queries. Clicks or other interactions on the user interface (UI) elements presenting this data takes the user to the vertical source from which the data was extracted (e.g., vertical for yellow pages, coupons, etc.) which in turn increases traffic to these feeds and verticals.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 includes a data component 102 that responds to processing of a query 104 and operates to identify entities (e.g., $Entity_1$ 106) on target webpages 108 (e.g., $Target Webpage_1$ 110) related to the query 104. The entity can be text, an image, concepts, links, etc., determined to be relevant to the query. The data component 102 obtains entity data (e.g., $Entity Data_1$ 112 for $Entity_1$ 106 and $Entity Data_2$ 114 for $Entity_2$ 116, etc.) relevant to the entities from disparate on-page data sources and off-page data sources (the data sources 118) to use in a search result (e.g., of search results 120) as output from a search engine 122.

Figure 2:
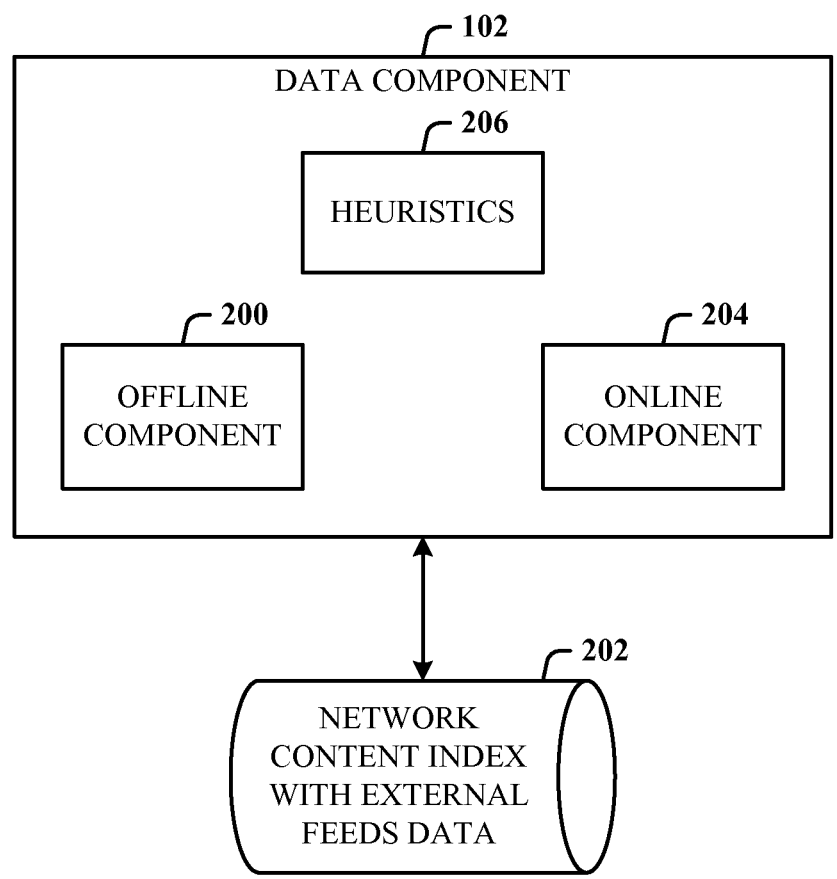
FIG. 2 illustrates a more detailed description of the data component.

FIG. 2 illustrates a more detailed description of the data component 102. The data component 102 can comprise an offline component 200 that collects entity data associated with entities from the off-page data sources and stores the collected entity data in a network content index 202 (e.g., the Internet). The data component 102 can also comprise an online component 204 that retrieves collected entity data from the off-page data sources and applies a relevance heuristic (of the heuristics 206) to determine on-page data and off-page data to use in association with the search result. The online component 204 retrieves the collected entity data at runtime and sends a realtime call to an appropriate data source for additional entity data of an entity. The offline component 200 groups the entities based on an identifier (e.g., URL) of the target webpage. The data component 102 inserts the entity data into a cached copy of an identifier e.g., URL) in the network content index 202. The data component 102 employs a relevance heuristic, for example, to determine entity data to show in the search result based on the query, a target webpage, and underlying user task. As previously indicated, the off-page data sources can be feeds (e.g., web feeds such as RSS (really simple syndication) feeds).

Figure 3:
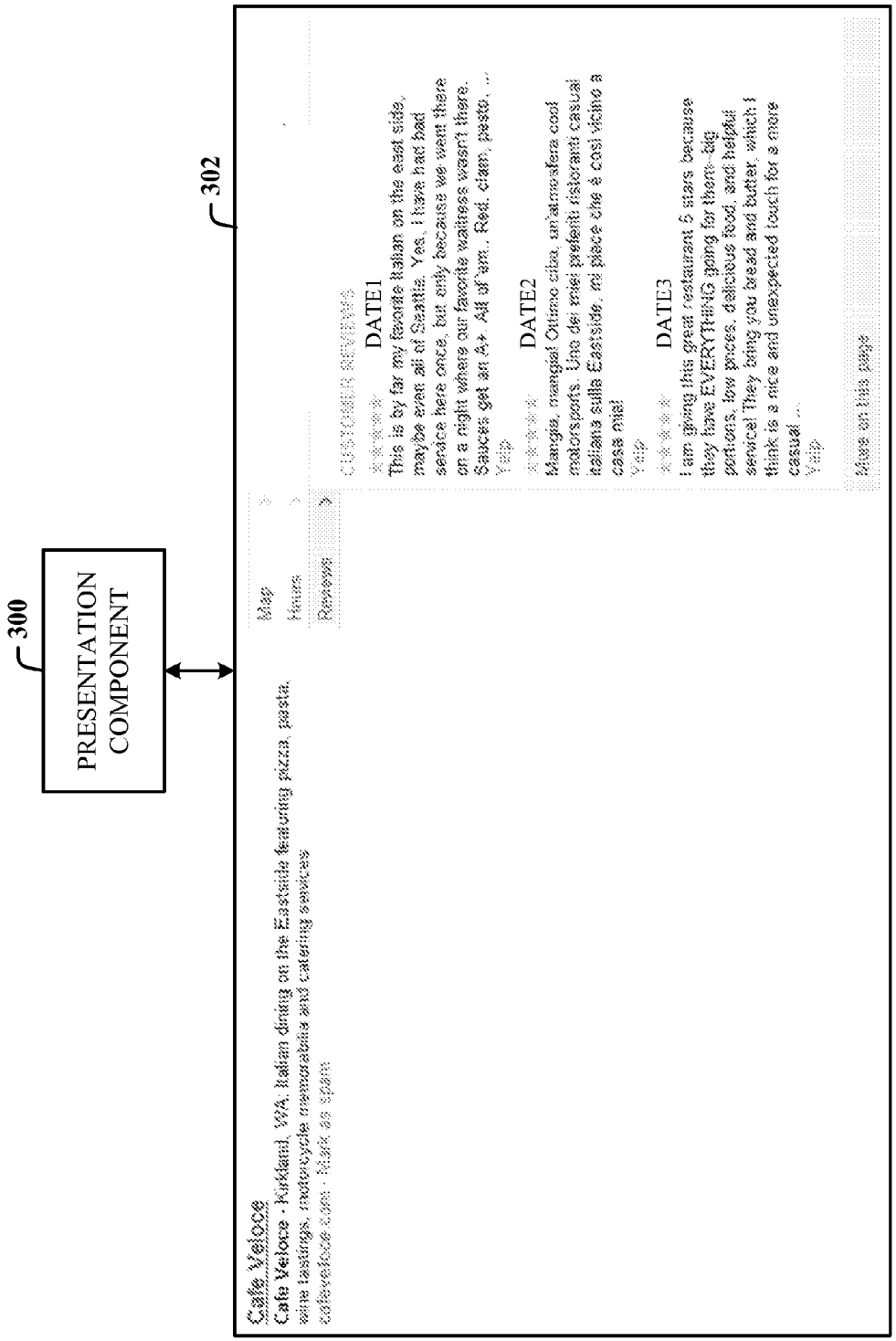
FIG. 3 illustrates an exemplary presentation component that presents the additional entity data in a search result.

FIG. 3 illustrates an exemplary presentation component 300 that presents the additional entity data in a search result. The presentation component 300 (engine for assembling the search result) presents the relevant content of the on-page data source and the off-page data sources in the search result 302. For example, a query for a "café veloce" is entered and processed. The additional entity data comprises a Map, Hours information, and Reviews information. The Reviews information can be obtained from other data sources, and then included in the search result 302.

Following is a more detailed description of the search result entry on a SERP that can be created to include a rich caption when employing the on-page and off-page data sources to provide enhanced caption information.

The entry can comprise a title, a fact row (e.g., shows factual information such as address, city, state, phone number, etc.) under the title, a snippet/rich caption section under the fact row, followed by au attribution (e.g., URL), and then a child answer. Visually connected (e.g., an aggregation to the right) to the entry is a list of one or more expansion objects that when selected (e.g., a hover-over) show additional information than in the original view, and a badge/official site object for linked-to information about the target webpage from which the information was obtained.

The captions can be a rich image caption that shows an image (an entity) extracted and determined to be a dominant image (image from an infobox or first floating image) from the target webpage. Another type of caption is a rich people caption that shows an image and structured data. Another type of caption shows an image from a social networking site profile. A rich commerce caption can be designed to show a product image, price information, free shipping information, and review count information, for example. Another caption can be a local rich caption for local businesses.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
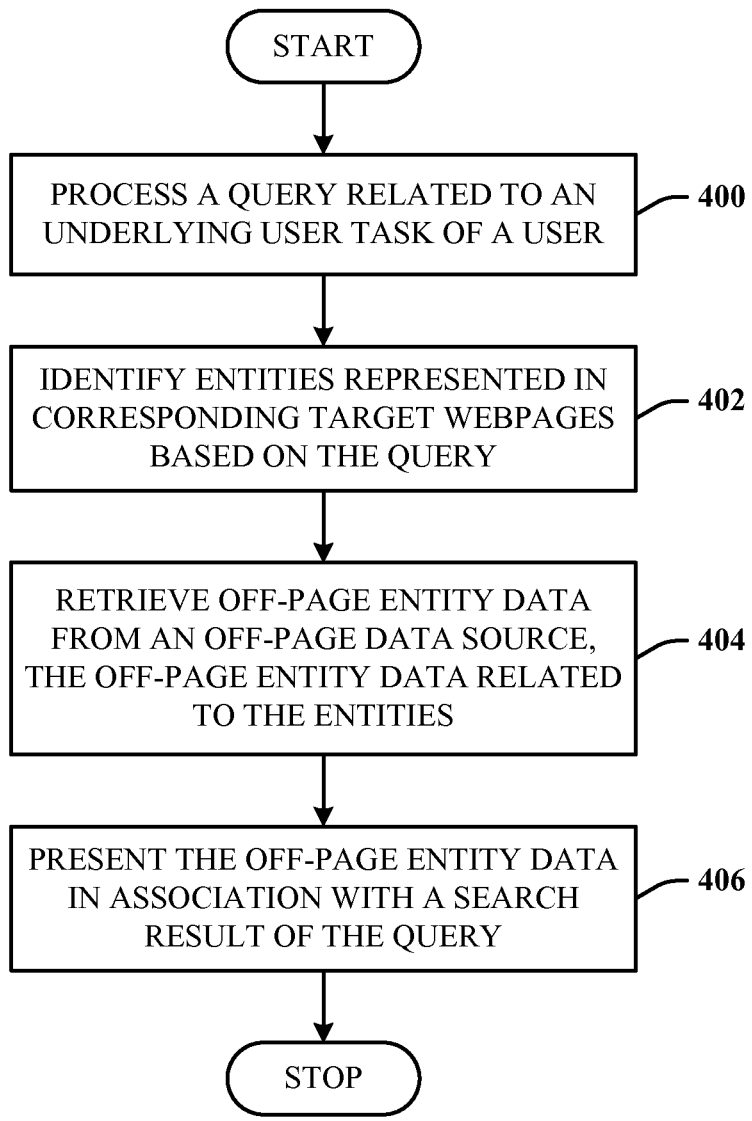
FIG. 4 illustrates a method in accordance with the disclosed architecture.

FIG. 4 illustrates a method in accordance with the disclosed architecture. At 400, a query is processed that is related to an underlying user task of a user. At 402, entities represented in corresponding target webpages are identified based on the query. At 404, off-page entity data is retrieved from an off-page data source. The off-page entity data is related to the entities. At 406, the off-page entity data is presented in association with a search result of the query.

Figure 5:
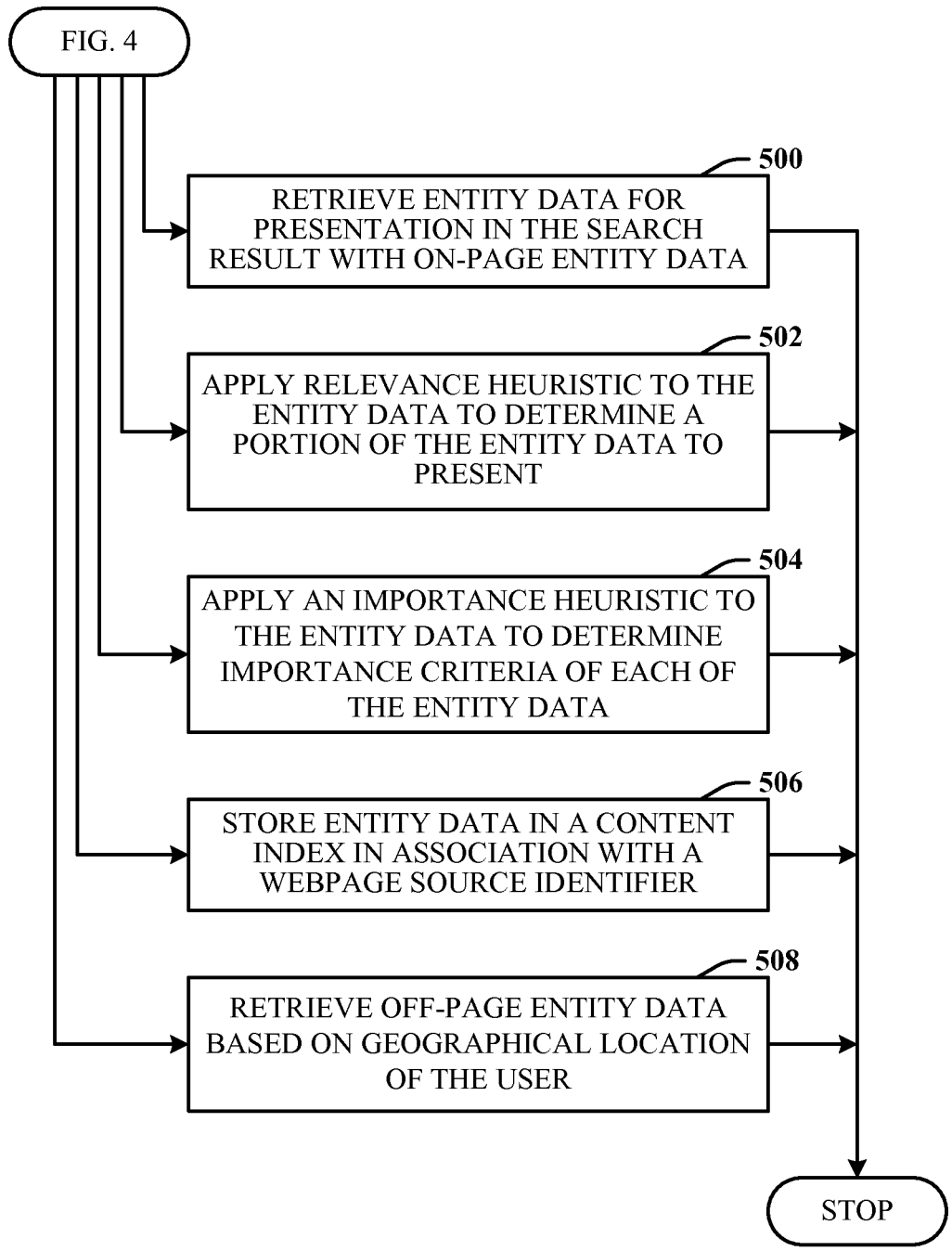
FIG. 5 illustrates further aspects of the method of FIG. 4.

FIG. 5 illustrates further aspects of the method of FIG. 4. Note that the flow indicates that each block can represent a step that can be included, separately or in combination with other blocks, as additional aspects of the method represented by the flow chart of FIG. 4. At 500, the entity data is retrieved for presentation in the search result with on-page entity data. At 502, a relevance heuristic is applied to the entity data to determine a portion of the entity data to present. At 504, an importance heuristic is applied to the entity data to determine importance criteria of each of the entity data. At 506, the entity data is stored in a content index in association with a webpage source identifier. At 508, the off-page entity data is retrieved based on geographical location of the user.

Figure 6:
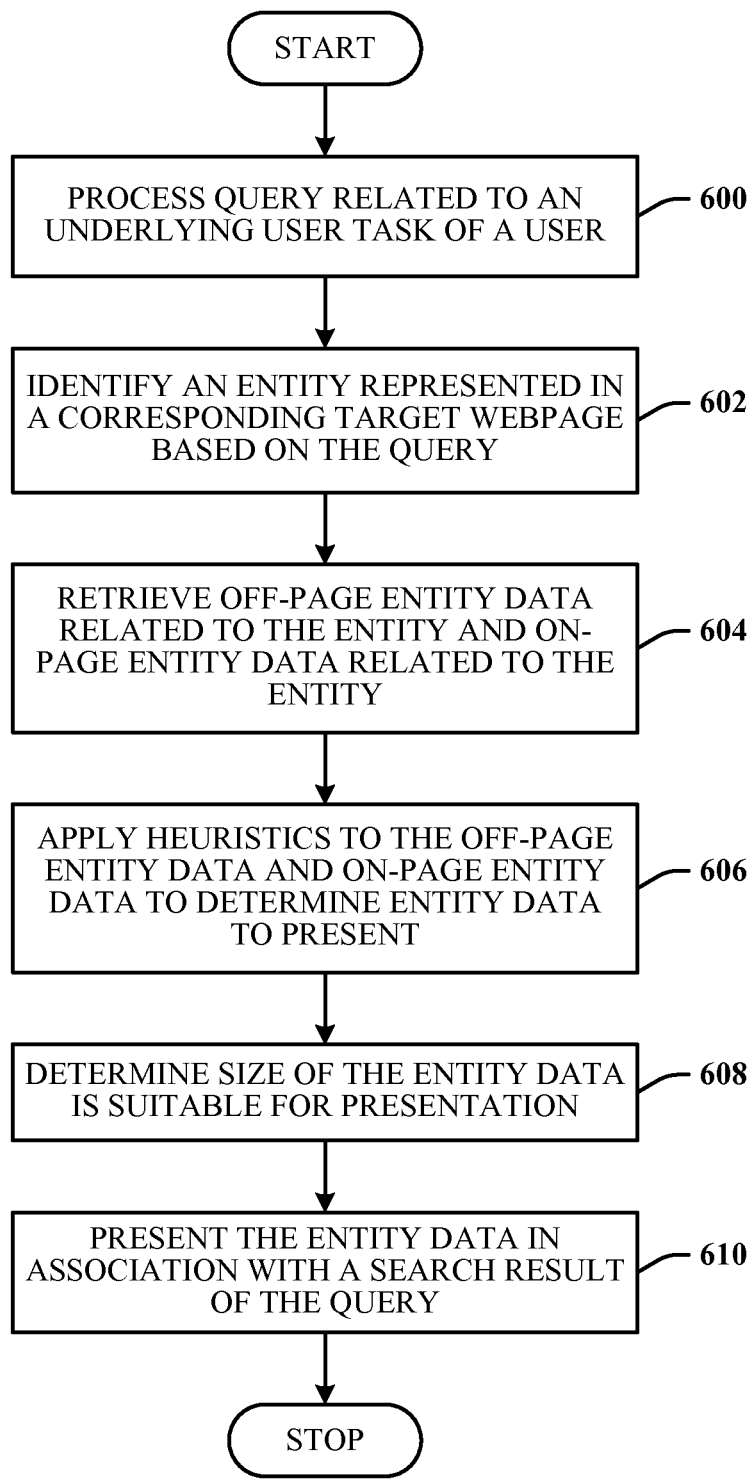
FIG. 6 illustrates an alternative method in accordance with the disclosed architecture.

FIG. 6 illustrates an alternative method in accordance with the disclosed architecture. At 600, a query is processed related to an underlying user task of a user. At 602, an entity represented in a corresponding target webpage is identified based on the query. At 604, off-page entity data related to the entity is retrieved and on-page entity data related to the entity is retrieved. At 606, heuristics are applied to the off-page entity data and on-page entity data to determine entity data to present. At 608, size of the entity data is determined for suitable presentation. At 610, the entity data is presented in association with a search result of the query.

Figure 7:
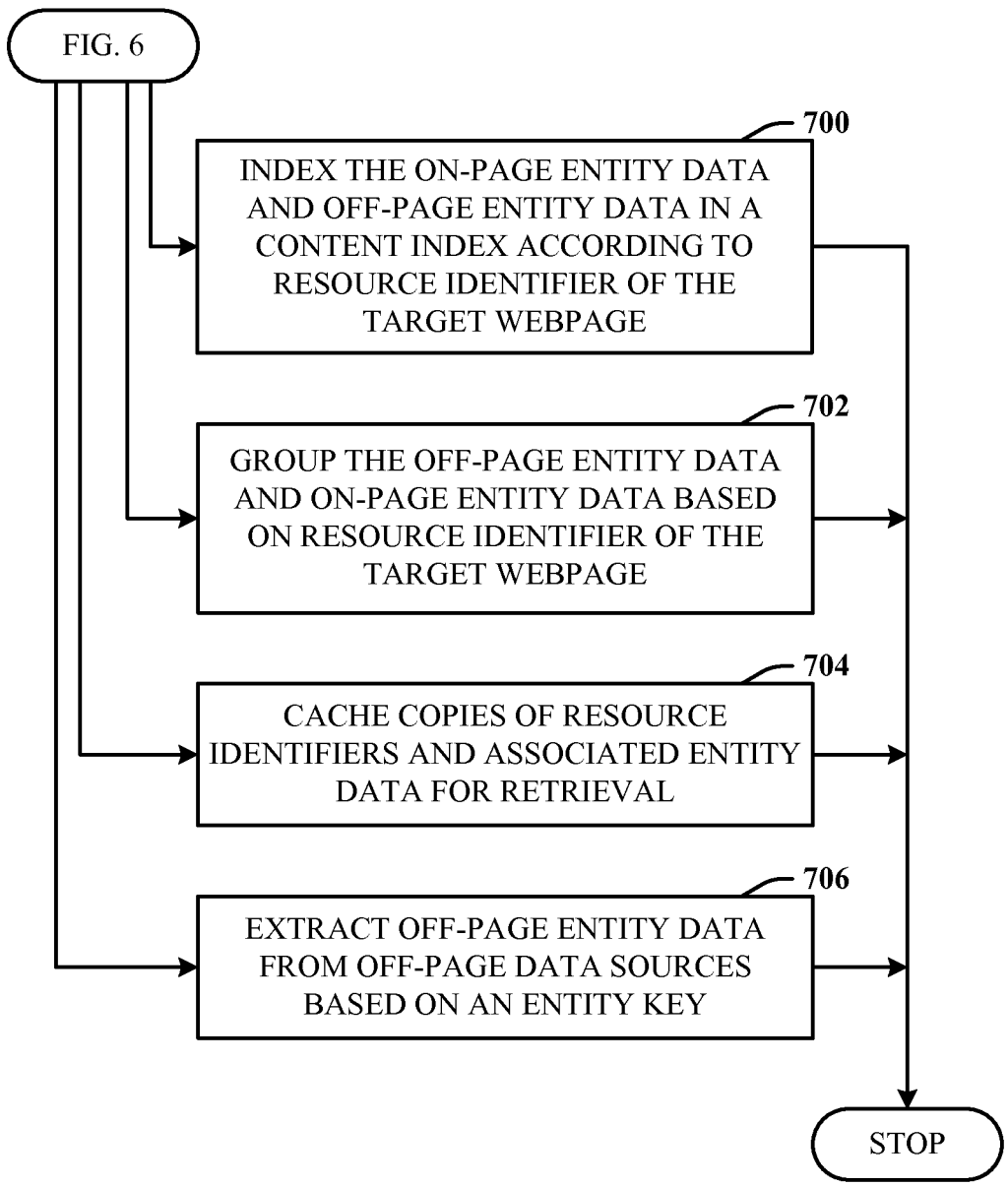
FIG. 7 illustrates further aspects of the method of FIG. 6.

FIG. 7 illustrates further aspects of the method of FIG. 6. Note that the flow indicates that each block can represent a step that can be included, separately or in combination with other blocks, as additional aspects of the method represented by the flow chart of FIG. 6. At 700, the on-page entity data and off-page entity data are indexed in a content index according to resource identifier of the target webpage. At 702, the off-page entity data and on-page entity data are grouped based on resource identifier of the target webpage. At 704, copies of resource identifiers and associated entity data are cached for retrieval. At 706, off-page entity data is extracted from off-page data sources based on an entity key.

Figure 8:
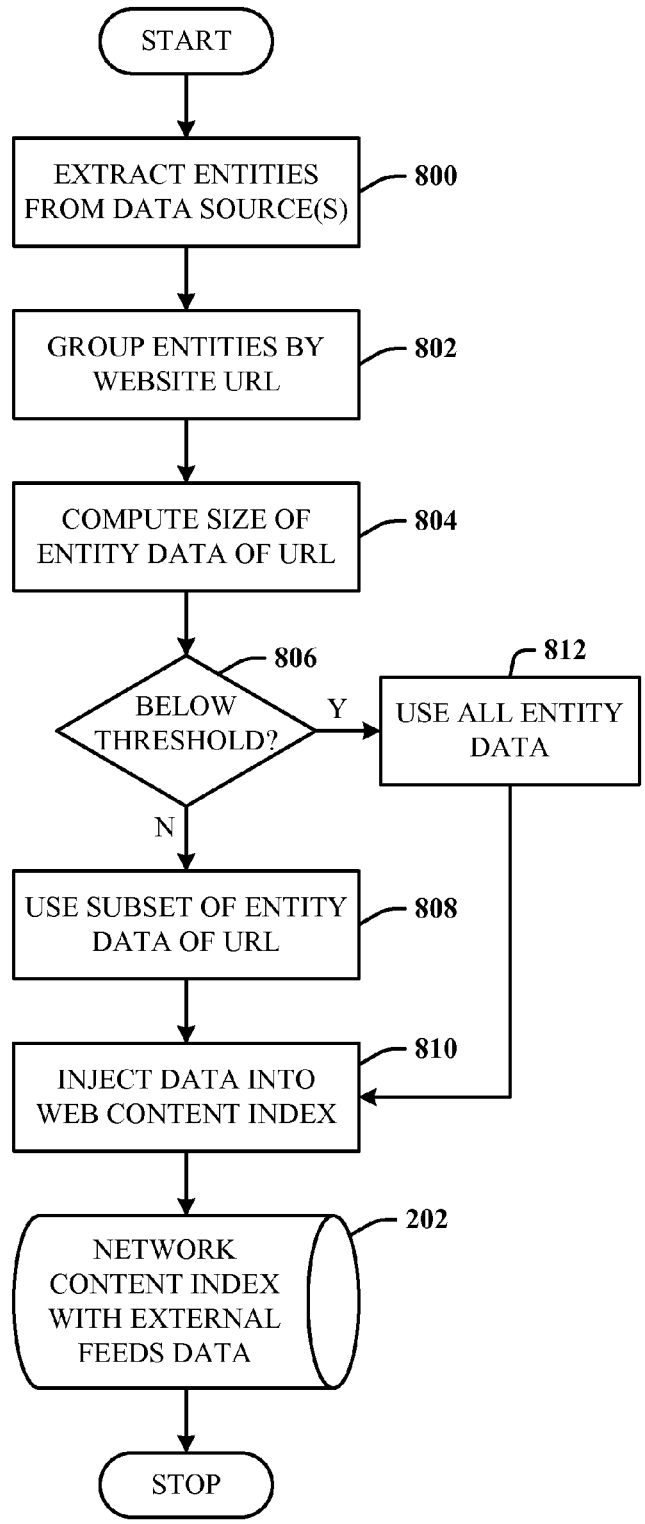
FIG. 8 illustrates a method of offline data retrieval of off-page data sources.

FIG. 8 illustrates a method of offline data retrieval of off-page data sources. At 800, entities are extracted from off-page data sources. At 802, the entities are grouped by website URL. At 804, the size of the entity data of a URL is computed. At 806, a check is made to determine if the size is below a predetermined threshold. If no, flow is to 808 to use a subset of the entity data of the URL. At 810, the subset of entity data is injected into the network content index 202, which includes data from external feeds. On the other hand, if the size of the entity data of the URL is below the threshold, at 806, flow is to 812 to then use all the entity data. Flow is then to 810 to inject the entity data into the network content index.

Figure 9:
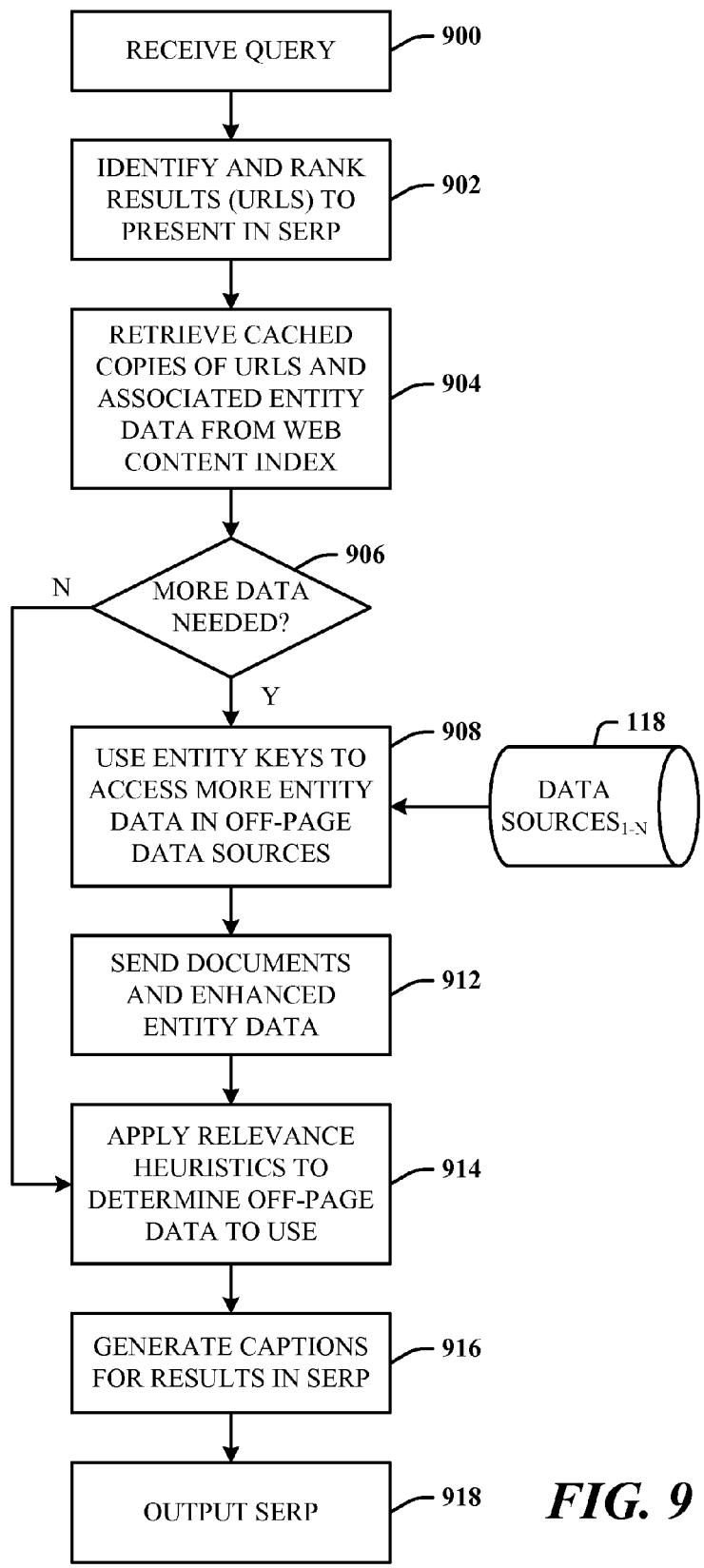
FIG. 9 illustrates a method of online data retrieval of off-page data sources.

FIG. 9 illustrates a method of online data retrieval of off-page data sources. At 900, a query is received and processed. At 902, results (URLs) are identified and ranked for presentation in the SERP. At 904, cached copies of the URLs and associated entity data are retrieved from a network content index. At 906, a determination is made as to if more data is needed. At 906, if yes, flow is to 908, to use entity keys to access more entity data in off-page data sources 118. At 912, the additional documents and enhanced entity data is sent. At 914, relevance heuristics are applied to determine off-page data to use. At 916, captions are generated for results in the SERP. At 918, the results page is output. Returning to 906, if more data is not needed, flow is from 906 to 914 to apply the heuristics and continue as previously mentioned.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
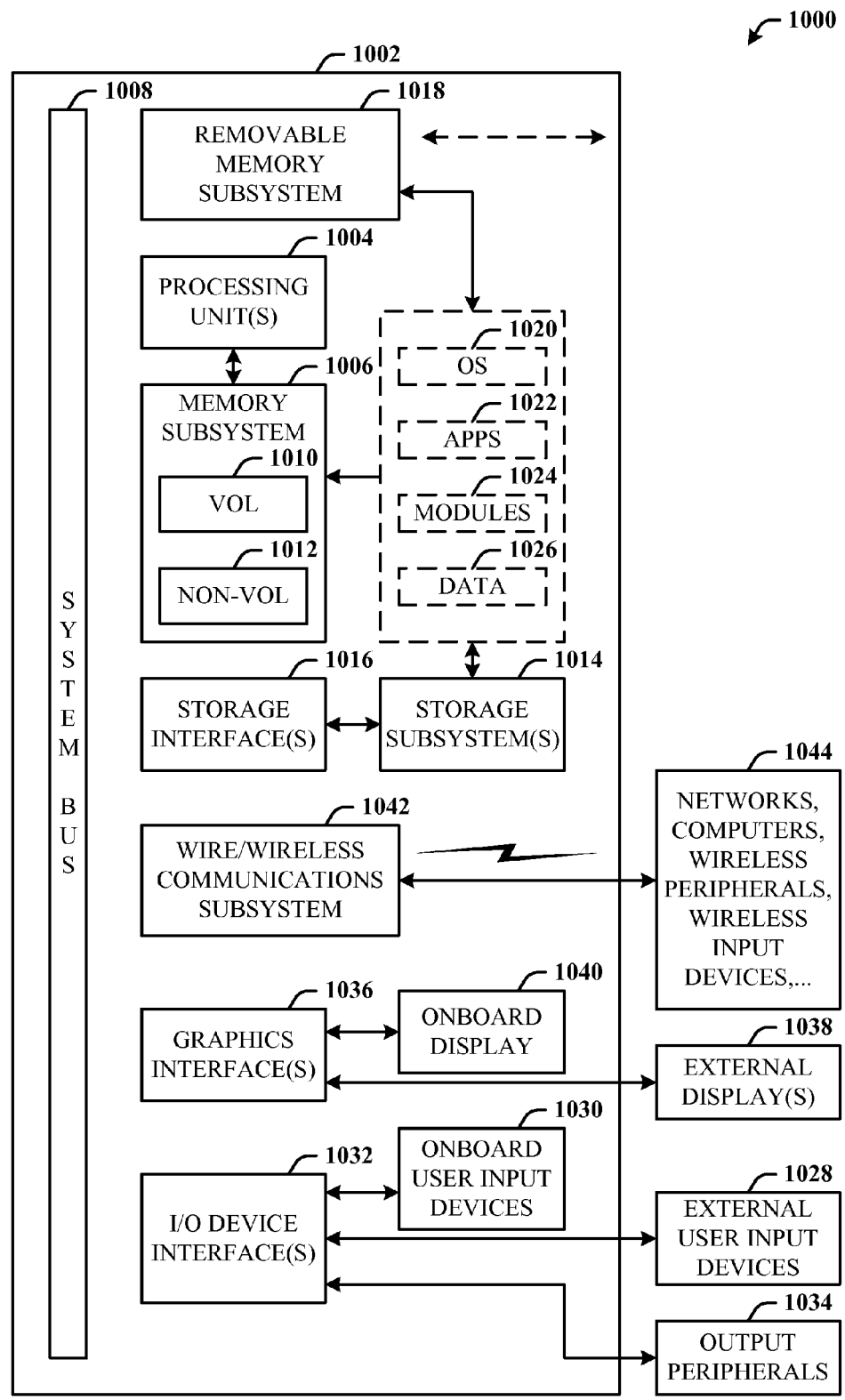
FIG. 10 illustrates a block diagram of a computing system that executes disparate data access for enhanced captions in accordance with the disclosed architecture.

Referring now to FIG. 10, there is illustrated a block diagram of a computing system 1000 that executes disparate data access for enhanced captions in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 10 and the following description are intended to provide a brief, general description of the suitable computing system 1000 in which the various aspects can be implemented. While the description above is in the general context of computer-executable instructions that can ran on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a computer-readable storage such as a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, micro-processor-based or programmable consumer electronics, and the like, each of which can be operatively coupled to one or more associated devices.

The system memory 1006 can include computer-readable storage (physical storage media) such as a volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the system memory 1006 to the processing unit(s) 1004. The system bus 1008 can be any of several types of bus structure that can farther interconnect to a memory bus (with or without a memory controller), and a peripheral bus (e.g., PCI, PCIe, AGP, LPC, etc.), using any of a variety of commercially available bus architectures.

The computer 1002 further includes machine readable storage subsystem(s) 1014 and storage interface(s) 1016 for interfacing the storage subsystem(s) 1014 to the system bus 1008 and other desired computer components. The storage subsystem(s) 1014 (physical storage media) can include one or more of a hard disk drive (HDD), a magnetic floppy disk drive (FDD), and/or optical disk storage drive a CD-ROM drive DVD drive), for example. The storage interface(s) 1016 can include interface technologies such as EIDE, ATA, SATA, and IEEE 1394, for example.

One or more programs and data can be stored in the memory subsystem 1006, a machine readable and removable memory subsystem 1018 (e.g., flash drive form factor technology), and/or the storage subsystem(s) 1014 (e.g., optical, magnetic, solid state), including an operating system 1020, one or more application programs 1022, other program modules 1024, and program data 1026.

The operating system 1020, one or more application programs 1022, other program modules 1024, and/or program data 1026 can include the entities and components of the system 100 of FIG. 1, entities and components of FIG. 2, entities and component(s) of FIG. 3, and the methods represented by the flowcharts of FIGS. 4-9, for example.

Generally, programs include routines, methods, data structures, other software components, etc., that perform particular tasks or implement particular abstract data types. All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and Bon-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1002 and includes volatile and non-volatile internal and/or external media that is removable or non-removable. For the computer 1002, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1002, programs, and data using external user input devices 1028 such as a keyboard and a mouse. Other external user input devices 1028 can include a microphone, an IR (infrared) remote control, a joystick, a game pad, camera recognition systems, a stylus pen, touch screen, gesture systems eye movement, head movement, etc.), and/or the like. The user can interact with the computer 1002, programs, and data using onboard user input devices 1030 such a touchpad, microphone, keyboard, etc., where the computer 1002 is a portable computer, for example. These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (CPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP-based) using logical connections via a wired/wireless communications subsystem 1042 to one or more networks and/or other computers. The other computers can include workstations, servers, routers, personal computers, microprocessor-based entertainment appliances, peer devices or other common network nodes, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A network can be used to connect computers to each other, to the Internet, and to wire networks (which use IEEE 802.3-related, media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
    a processor coupled to a memory, the processor configured to execute computer-executable instructions associated with at least a data component;
    a search engine configured to receive and process a query related to an underlying user task of a user for obtaining a search result comprising links to target webpages;
    the data component configured to respond to processing of the query and operates to identify on-page data content elements on the target webpages related to the search result corresponding to the query, the data component obtains additional content element data comprising at least one of concepts or content, determined to be relevant to the content elements, from disparate off-page data from sources other than the target webpages to use in the search result, wherein the data component further comprises:
        an offline component configured to collect content element data of an identifier associated with content elements from the off-page data sources, and determine size of the collected content element data of the identifier: if the size of the collected content element data is below a threshold, all the collected content element data is stored in a network content index, and if the size of the collected content element data is not below the threshold, the collected content element data is injected into the network content index; and
        an online component configured to retrieve collected content element data from the off-page data sources and applies a relevance heuristic to determine on-page data and off-page data to use in association with the search result, wherein the online component retrieves the collected content element data at runtime and sends a realtime call to an appropriate data source for additional content element data of a content element; and
    a presentation component configured to present the on-page data content elements and the additional content element data from the off-page data sources in a caption accompanying the links to the target webpages in the search result.

2. The system of claim 1, wherein the offline component collects content element data associated with content elements from the off-page data sources and stores the collected content element data in the network content index, which is a search content index.

3. The system of claim 2, wherein the offline component groups the content elements based on an identifier of the target webpage.

4. The system of claim 3, wherein the data component inserts the content element data into a cached copy of an identifier in the search content index.

5. The system of claim 1, wherein the data component employs a relevance heuristic to determine content element data to show in the search result based on the query, a target webpage, and underlying user task.

6. The system of claim 1, wherein the off-page data sources are external feeds.

7. The system of claim 1, wherein the presentation component comprises an engine configured to assemble the search result that presents the relevant content of the on-page data source and the off-page data sources in the search result.

8. The system of claim 1, wherein copies of resource identifiers and associated content element data are cached for retrieval.

9. The system of claim 1, wherein off-page content element data is extracted from off-page data sources based on a content element key.

10. A computer-implemented method, comprising steps of:
processing a search query related to an underlying user task of a user, to obtain a search result comprising links to target web pages;
identifying on-page content elements in corresponding target webpages based on the search query;
retrieving off-page entity data to use in the search result, from off-page data sources different from the target webpages, the off-page entity data comprising at least one of concepts or content determined to be related to the on-page content elements;
collecting, by an offline component, content element data of an identifier associated with content elements from the off-page data sources;
determining size of the collected content element data of the identifier, and if the size of the collected content element data is below a threshold, storing all the collected content element data in a web content index, and if the size of the collected content element data is not below the threshold, injecting the collected content element data into the web content index;
retrieving, by an online component, the collected content element data from the off-page data sources, wherein the online component retrieves the collected content element data at runtime and sends a realtime call to an appropriate data source for additional content element data of a content element;
applying an importance heuristic to the off-page content element data and on-page content element data to determine importance criteria of the off-page content element data and on-page content element data to present; and
presenting the on-page data content element data and the additional content element data from the off-page data sources in a caption accompanying the links to the target web pages in the search result of the query.

11. The method of claim 10, further comprising retrieving the content element data for presentation in the search result with on-page content element data.

12. The method of claim 10, further comprising applying a relevance heuristic to the content element data to determine a portion of the content element data to present.

13. The method of claim 10, further comprising applying an importance heuristic to the entity data to determine importance criteria of each of the content element data.

14. The method of claim 10, further comprising storing the content element data in a content index in association with a webpage source identifier.

15. The method of claim 10, further comprising retrieving the off-page content element data based on geographical location of the user.

16. A computer-implemented method, comprising steps of:
processing a query related to an underlying user task of a user, to obtain a search result comprising links to target webpages;
identifying a content element represented in each corresponding target webpage of the target webpages related to the search result based on the query;
retrieving off-page content element data related to the content element and on-page content element data related to the content element, the off-page data being retrieved from off-page data sources different from the target webpages;
collecting, by an offline component, content element data of an identifier associated with content elements from the off-page data sources;
determining size of the collected content element data of the identifier, and if the size of the collected content element data is below a threshold, storing all the collected content element data in a network content index, and if the size of the collected content element data is not below the threshold, injecting the collected content element data into the network content index;
retrieving, by an online component, the collected content element data from the off-page data sources, wherein the online component retrieves the collected content element data at runtime and sends a realtime call to an appropriate data source for additional content element data of a content element;
applying heuristics to the off-page content element data and on-page content element data to determine content element data to present; and
presenting the on-page data content element data and the additional content element data from the off-page data sources in a caption accompanying the links to the target webpages in the search result.

17. The method of claim 16, further comprising indexing the on-page content element data and off-page content element data in a content index according to resource identifier of the target webpage.

18. The method of claim 16, further comprising grouping the off-page content element data and on-page content element data based on resource identifier of the target webpage.

19. The method of claim 16, further comprising caching copies of resource identifiers and associated content element data for retrieval.

20. The method of claim 16, further comprising extracting off-page content element data from off-page data sources based on a content element key.

* * * * *